(No Model.)
T. THOMPSON.
FISH TRAP.
No. 353,767. Patented Dec. 7, 1886.
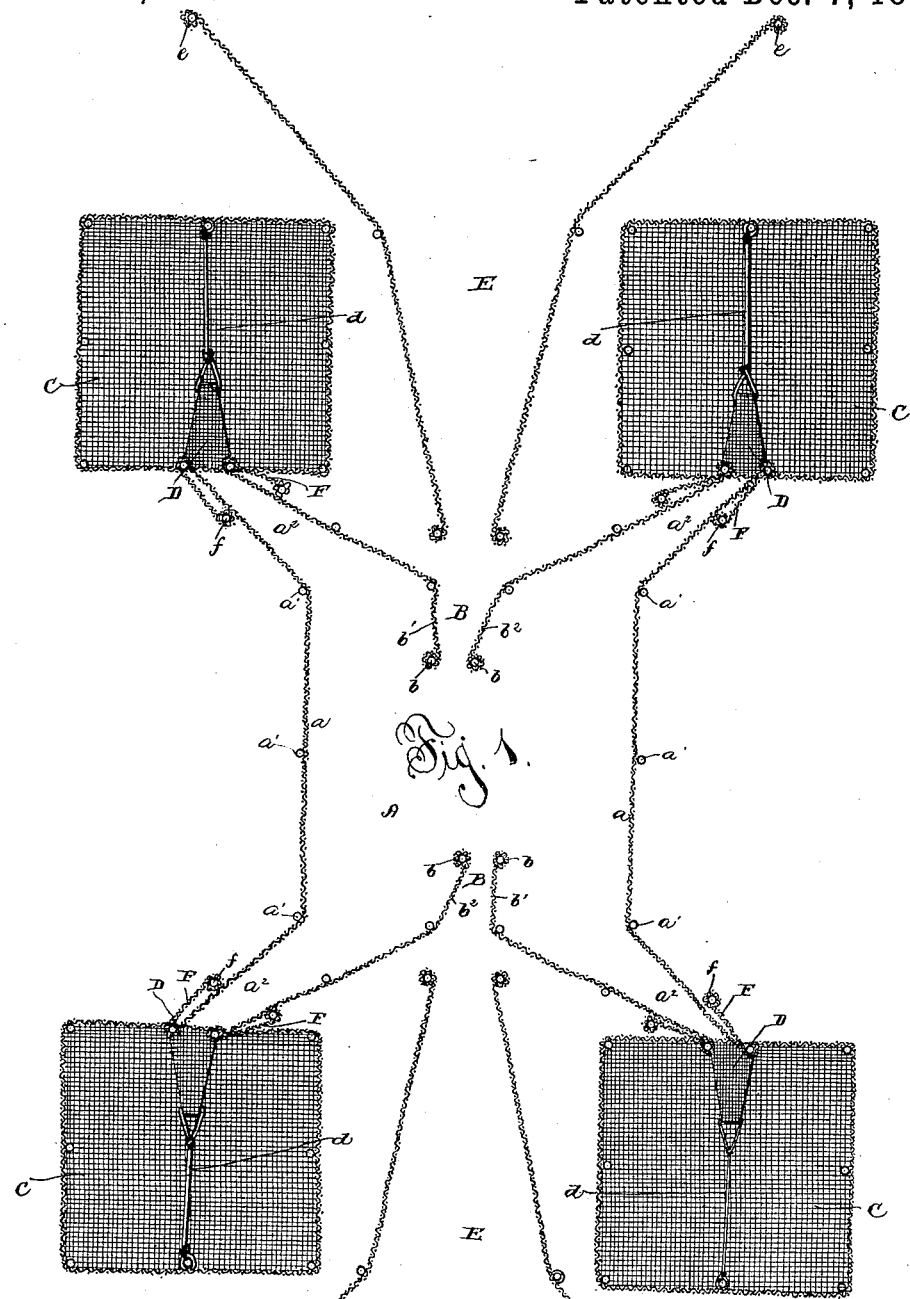
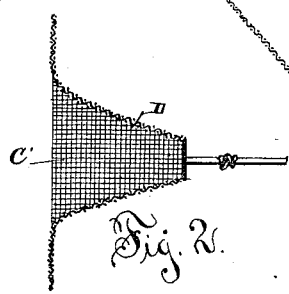
Witnesses:
John Enders
[signature]
Inventor:
Thomas Thompson
by Allan Rutherford
Attorney

UNITED STATES PATENT OFFICE.

THOMAS THOMPSON, OF EDENTON, N. C., ASSIGNOR OF ONE-FOURTH TO ALLAN RUTHERFORD, OF WASHINGTON, D. C.

FISH-TRAP.

SPECIFICATION forming part of Letters Patent No. 353,767, dated December 7, 1886.

Application filed October 21, 1886. Serial No. 216,856. (No model.)

*To all whom it may concern:*

Be it known that I, THOMAS THOMPSON, a citizen of the United States of America, residing at Edenton, in the county of Chowan and State of North Carolina, have invented certain new and useful Improvements in Fish-Traps, of which the following is a specification, reference being had therein to the accompanying drawings.

This invention pertains to certain new and useful improvements in fish-traps; and it consists in the construction, combination, and arrangement of the parts, substantially as hereinafter fully set forth, and particularly pointed out in the claims.

In the accompanying drawings, Figure 1 is a plan view of my invention, and Fig. 2 is a detail sectional view thereof.

In carrying out my invention I construct the "heart" or main compartment A of two oppositely-disposed parallel walls, $a$ $a$. These walls are of made of ordinary fish-netting, and are secured at their ends and central portions by means of upright stakes $a'$, the connection between said stakes and the netting being effected by ordinary means. Each end of each of these walls $a$ $a$ of the heart or compartment A is extended outwardly on an inclined plane, forming each one side of a "wing" or passage-way, $a^2$, the other side of each of such wings or passage-ways being formed by securing one end of a similar netting on a line with the outer end of said way $a^2$, and extended to a point near the center of each end of the heart or compartment A. The netting of each side or wall is here secured by stakes $b$ $b$, and said walls are extended inwardly into said heart or compartment, two on a direct line, as at $b'$ $b'$, and the other two on an inclined plane, as at $b^2$ $b^2$, whereby the fish on entering the openings B B thus formed are directed in their movement, as will appear farther on.

The outer contracted end of each wing or passage-way $a^2$ opens into a square-shaped "pound" or trap, C, said traps being secured, of course, at their ends and central portions by stakes, as hereinbefore stated in relation to other parts. To each of the openings C' C' of said pounds or traps is secured, on the inner side or surface, one end of a cone-shaped tunnel, D, said tunnels opening into said pounds or traps. To the ends of said tunnels are connected cords $d$ $d$, secured at their opposite ends to the centrally-disposed stakes of said pounds or traps, whereby said tunnels are held in their proper position.

E E are two oppositely-disposed guideways or leads, the opposite sides of which are secured at their extreme outer ends some distance apart by stakes $e$ $e$, and are likewise secured at their center on a line with the outer sides of the pounds or traps, and from this point said sides taper inwardly to a point a short distance from the openings B.

The connection between each wing or passage-way and its adjoining pound or trap is additionally strengthened, or the certainty of the retention of the fish at this point insured, by means of short extensions of netting F F, secured at one end to said pounds or traps and extended a short distance along the side walls of the wings or passage-ways, and attached to stakes $f$ $f$. From this it will be seen that the fish on approaching the trap will enter through the guideways or leads E, or between the outer sides of the side walls thereof and the side of the adjoining pound or trap. The fish will then pass through the openings B B into the heart or main compartment A, and from thence through the inclined wings or passage-ways $a^2$ through the cone-shaped tunnels into the pounds or traps.

In the construction of my invention I provide four pounds or traps connecting with the heart or main compartment, whereas the fish-traps heretofore employed only provided for one or two pounds or traps. Further, it will be seen that by securing the ends of the wings or passage-ways $a^2$ to the openings in the pounds or traps the same are additionally secured or held in position in relation to each other.

It will be understood, of course, that I do not confine myself to the employment of four pounds or traps, for, if desired, three of such pounds or traps may be employed to like advantage, and the guideways or leads may be changed accordingly.

Having thus fully described my invention, what I claim, and desire to secure by Letters Patent, is—

1. The herein-described fish-trap, consisting of the heart or main compartment having oppositely-disposed openings, the inclined wings or passage-ways connected to the corners of said heart, the pounds or traps having the cone-shaped tunnels and connected to the ends of said wings or passage-ways, and the inclined guideways located at opposite sides of the heart and between and extending beyond two of the pounds or traps, substantially as shown and described.

2. The combination, with the heart or main compartment having oppositely-disposed openings, and the pounds or traps, of the inclined wings or passage-ways connecting said heart at its four corners with the pounds or traps, arranged substantially as shown and described.

3. The combination, with the heart or main compartment having opposite openings, the inclined wings or passage-ways connected to the four corners of said heart, and the pounds or traps connected to the ends of said wings or passage-ways, of the inclined guideways or leads secured each at its ends and center by stakes, whereby a passage-way is provided between its walls and between each wall and pound or trap, substantially as shown and described.

In testimony whereof I have affixed my signature in presence of two witnesses.

THOS. THOMPSON.

Witnesses:
D. G. BOND,
JNO. C. BOND.